United States Patent [19]

Kurkjian et al.

[11] Patent Number: 4,729,475

[45] Date of Patent: Mar. 8, 1988

[54] SNAP-TOGETHER STORAGE CONTAINER WITH NESTING ELEMENTS

[75] Inventors: Charles V. Kurkjian, Oak Park; Bruce E. Heggeland, Palatine, both of Ill.

[73] Assignee: ACCO World Corporation, Wheeling, Ill.

[21] Appl. No.: 911,897

[22] Filed: Sep. 25, 1986

Related U.S. Application Data

[63] Continuation-in-part of Ser. No. 881,736, Jul. 3, 1986, abandoned.

[51] Int. Cl.⁴ .............................................. B65D 85/00
[52] U.S. Cl. .................................... 206/425; 220/338; 220/341
[58] Field of Search ............... 220/337, 338, 340, 341; 206/425

[56] References Cited

U.S. PATENT DOCUMENTS

| | | | |
|---|---|---|---|
| 2,605,926 | 8/1952 | Casey | 220/338 |
| 2,765,949 | 10/1956 | Hillman | 220/338 |
| 3,055,534 | 9/1962 | Boenecke | 220/338 |
| 3,984,028 | 10/1976 | Zinnbauer | 220/338 |
| 4,029,234 | 6/1977 | Johnson et al. | 220/338 |
| 4,203,529 | 5/1980 | Torassa et al. | 220/338 |
| 4,302,866 | 12/1981 | Irvin | 220/341 |
| 4,428,482 | 1/1984 | Ogawa | 220/340 |

*Primary Examiner*—Joseph Man-Fu Moy
*Attorney, Agent, or Firm*—Willian Brinks Olds Hofer Gilson & Lione Ltd.

[57] ABSTRACT

A readily assembled covered container is disclosed. The container has a pivoting cover which snap-attaches to a tray. In the disclosed embodiment, bosses provided on the rear sidewalls of the tray are received in bores formed in the rear sidewalls of the cover to attach the cover to the tray. The bosses have a beveled surface that facilitates cover attachment, and each bore advantageously has a ramp-like channel associated with it that directs a respective boss to engagement within its bore. The tray nests within the inverted cover in a compact arrangement for improved packing, shipping and storing.

3 Claims, 5 Drawing Figures

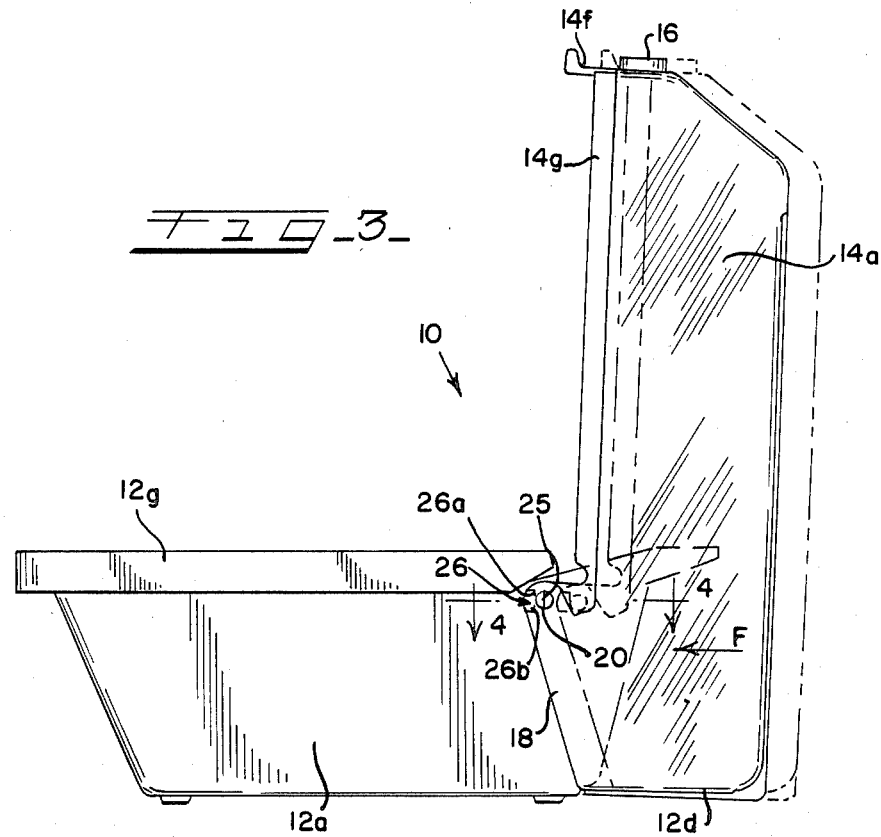
Fig-3-
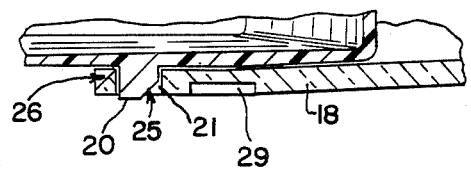
Fig-5-
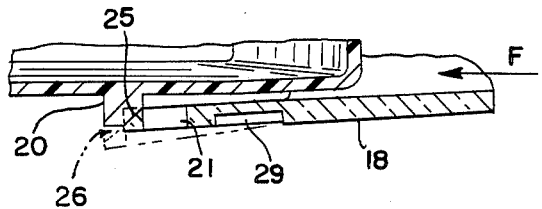
Fig-4-

SNAP-TOGETHER STORAGE CONTAINER WITH NESTING ELEMENTS

This application is a continuation in-part of U.S. Ser. No. 06/881736, filed July 3, 1986, now abandoned.

FIELD OF THE INVENTION

This invention is generally related to containers having attached covers, and is particularly related to a container having a pivotable cover used for storing floppy disks, such as those used with personal computers.

BACKGROUND OF THE INVENTION

The invention was originally developed as a storage container for floppy disks. Floppy disks are used in the operation of personal computers both at home and in business.

The thin, square floppy disks are stored generally upright in a catalog-type fashion, similar to card catalogs used in libraries. Storage containers for the disks have been designed that are box-like in shape, being formed of a tray, or receptacle, and a cover. The tray is relatively deep and the floppy disks are stacked in the tray. The cover is typically also quite deep, and ordinarily cooperates with the tray to completely close the container.

The cover is usually pivotable so that it swings upwardly to open the tray. For example, it is known to permanently connect a cover to the lateral sidewalls of the tray near the tray rear through the use of rivets and the like.

A problem with such prior art storage containers is that the covers are not made to be assembled to the trays by the user. This, of course, necessitates final assembly at the manufacturing plant and therefore adds to the cost of the container. Larger packages for shipment and sale of the fully assembled containers are also required. This increases the cost of the container, as does the extra volume taken up when the assembled containers are stored or shipped.

SUMMARY OF THE INVENTION

It is a principal objective of this invention to provide a storage container having a pivotable cover for a tray where the cover is readily attached to the tray, such as by the user. It is a related objective of this invention to provide such a user-assembled container where the cover and tray nest when separated to thereby reduce the volume occupied by the container for improved packing, shipping and storage.

To these ends, the present invention comprises a tray and a cover for the tray. A boss or pin extends from each of two opposite sides of the tray, with the pins located toward the rear of the tray and adjacent the tray's upper edge.

The cover has an aperture, such as a bore, formed in each of two opposite depending side portions of the cover. The pins of the tray are received in respective bores to attach the cover to the tray. The bores, like the pins, are located toward the rear of the cover side portions so that the cover flips upwardly open on the rear pivots formed by the pins.

To enable ready assembly of the cover to the tray, such as by the user, each of the pins has a beveled surface formed thereon. The opposite sides of the tray and cover are overlapped in assembly, with the cover being attached to the tray by sliding the cover side portions along the tray sides to seat the pins in the bores. In so doing, the edges of the cover side portions initially contact the pins and then ride up the beveled surfaces. This flexes the cover side portions apart, with the cover then becoming unflexed when the pins drop into their respective bores. A quick and easy snap-attachment of the cover to the tray is thus provided.

In a present form of the invention, each pin has a top, an axis and a flat surface formed thereon that is inclined toward the pin top and axis. The cover advantageously further includes a ramp-like channel that extends from the cover edge up to each bore. The ramp-like channels are sized to permit the pins to slide along the channels and serve to direct the pins into the bores. This further facilitates user attachment of the cover to the tray.

It will of course be understood that the pins could be formed on the cover and the apertures or bores formed in the tray.

Another feature of the present invention is that the tray is sized to nest within the cover when tray and cover are unassembled. This reduces the profile, and thus the volume, of the container for economies in packaging, shipping and storage.

Yet another feature of the invention resides in an interleaved mating engagement of the cover and tray which provides a sure closure for the container that serves to keep out dust, and is also aesthetically pleasing. This feature also assures that the cover cannot be removed from the base when the cover is in the closed and locked position.

The foregoing features and advantages of the present invention will be more readily understood upon consideration of the following detailed description of the invention taken in conjunction with the accompanying drawings, in which:

BRIEF DESCRIPTION OF THE DRAWINGS

FIG. 3 is a side elevational view of the cover attached to the tray, with phantom lines indicating assembly of the cover with the tray;

FIG. 4 is an enlarged sectional view taken along line 4—4 of FIG. 3 detailing the juxtaposition of the pins of the tray and the bores of the cover during assembly; and FIG. 5 is an enlarged cross sectional view similar to FIG. 4 showing the pins of the tray seated in the cover bores.

DETAILED DESCRIPTION OF AN EMBODIMENT OF THE INVENTION

Figure 1:
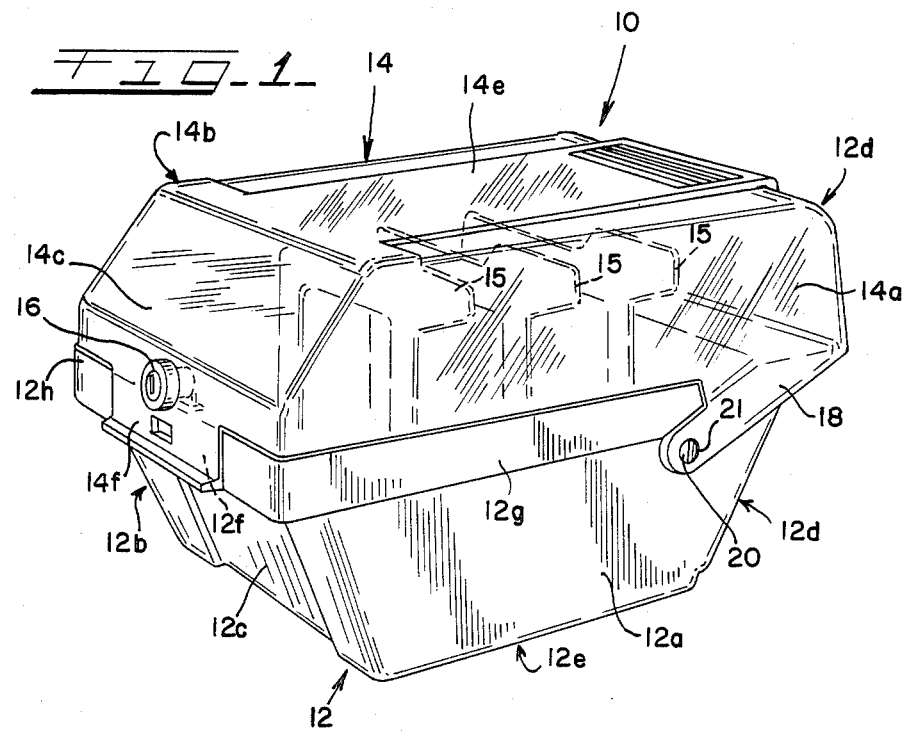
FIG. 1 is a perspective view of an embodiment of a readily assembled storage container adapted for magnetic disks made in accordance with this invention.

A readily assembled storage container 10 made in accordance with the present invention is illustrated in FIG. 1. The box-like storage container 10 has a receptacle or tray 12 and a cover 14. The one-piece tray 12 has a pair of lateral sidewalls 12a and 12b, a front wall 12c, a rear wall 12d and a bottom or base 12e. Rigid dividers 15 are inserted into the bottom 12e in slots (not shown) to form compartments for floppy disks (not shown). The sidewalls 12a–12d define an opening for the tray 12. It will be noted that the height of the tray 12 is less than the height of the floppy disks that are received in the tray 12. This improves the ability to see and access the disks, which are stored generally upright in the tray.

The cover 14 has a pair of lateral sidewalls 14a, 14b which depend from opposite sides of a top wall 14e. A front wall 14c and rear wall 14d, which also depend from the top wall 14e, complete the cover. All of the walls 14a–14e form the one-piece cover 14.

The cover 14 is made of a transparent plastic and has a substantial depth (or height, depending on perspective) to close the tray 12 yet permit viewing and accessing the disks as noted above. As will be set forth in further detail hereafter, the cover 14 has a bottom edge that mates with a particularly configured top edge of the tray 12.

It will also be noted that the front and rear walls of both the tray 12 and cover 14 are sloped for a more pleasing design. A conventional lock 16 is further provided for the container 10 to lock the cover 14 closed with the tray 12, if desired.

The cover 14 has identical arm portions 18 formed as part of the lateral sidewalls 14a, 14b. These arm portions 18 are located toward the rear of the sidewalls. The arm portions 18 connect the cover 14 to the tray 12 through the engagement of bosses 20 (only one of which is shown) formed on the lateral tray sidewalls 12a, 12b, within respective apertures or bores 21 formed in the arm portions 18. The bosses 20 are likewise located toward the rear of the tray 12. A pivot connection between the cover 14 and tray 12 is thus provided that permits the cover 14 to be flipped open by lifting the cover front end 14c upwardly.

It will be noted that the lateral tray sidewalls 12a, 12b extend generally perpendicularly from the bottom wall 12e. The lateral cover sidewalls 14a, 14b likewise depend generally perpendicularly from the cover top 14e (a very slight outboard slope is provided). The horizontal distance from cover sidewall 14a to cover sidewall 14b (measured along the interior bottom, side-to-side (minor axis)) is just slightly larger than the distance from tray sidewall 12a to tray sidewall 12b (measured along the exterior, side-to-side (minor axis)). This results in the cover arm portions 18 closely overlapping the tray lateral sidewalls 12a, 12b when the cover is assembled to the tray.

The cover 14 is designed to attach to the tray 12 in a ready snap-fit engagement. To this end, each boss 20 is in the form of a short cylinder which has a bevel along at least a portion of its top (outboard) edge. In this embodiment, the bevel takes the form of a planar inclined surface 25 (best seen in FIGS. 4 and 5). This inclined surface 25 faces rearwardly, and slopes toward the major axis of the boss 20 and the boss top.

Briefly, the cover 14 is attached to the tray 12 by first positioning the arm portions 18 overlapping the tray sidewalls 12a, 12b and adjacent the bosses 20. The cover 14 is next moved relative to the bosses 20 so that the leading edge of each arm portion 18 first contacts and then rides up the inclined surface 25 of a respective boss. The cover 14 is then manipulated to move the arm portions 18 over the bosses 20, whereupon the bosses 20 engage within a respective bore 21 to fix the cover 14 in place.

More specifically, and with reference now to FIGS. 3-5, the arm portions 18 are additionally provided with ramp-like channels 26 (only one of which is shown) to facilitate engagement of the bosses 20 in the bores 21. A channel 26 is formed on each of the arm portions 18, and extends from the leading edge of the arm portion up to a respective bore 21.

Each of the channels 26 has an inclined slope that is complimentary to that of the inclined surfaces 25 of the bosses 18. The channels 26 are recessed in the arm portions 18 forming channel sidewalls 26a, 26b. The channels 26 are sized to permit the bosses 18 to freely slide between the channel sidewalls 26a, 26b up the inclined channel ramps and directly to the bores 21.

As shown in FIG. 3 in phantom line, the cover 14 is initially tilted to align the arm portion channels 26 with respective bosses 20. The cover 14 is then moved toward the front of the tray 12 with each boss 18 first engaging and then sliding up its channel ramp 26 (FIG. 4). This causes the arm portions 18 of the cover sidewalls 14a, 14b to flex outwardly (i.e. away from the tray sidewalls 12a, 12b). The cover 14 is moved forwardly (in the direction of the arrow F in FIG. 3) until the bosses 20 pass over the lips of the bores 21, whereupon the bosses 20 snap into the bores 21. The arm portions 18, which are now unflexed, retain the bosses 20 within the bores 21 (FIGS. 3 (solid line) and 5).

The cover 14 when so attached is freely pivotable on the bosses 20 to open and close the container 10. The major axis of the cover is roughly perpendicular to that of the tray 12 in the fully open position (FIG. 3). It will be noted that the bottom edge of the rear wall 14d of the cover 14 abuts the bottom edge of the rear wall 12d of the tray 12 along a slight indentation provided in the rear wall 12d. This serves as a stop for the cover in the fully open position.

A principal advantage of providing a readily assembled covered container 10 of the foregoing type is that the cover 14 and tray 12 can be shipped and sold unassembled to the user. This reduces the labor involved in producing the container, since a final assembly step is eliminated. It also has the advantage of reducing the packing volume of the container where, as here, the unassembled cover 14 and tray 12 are designed to nest with each other.

Figure 2:
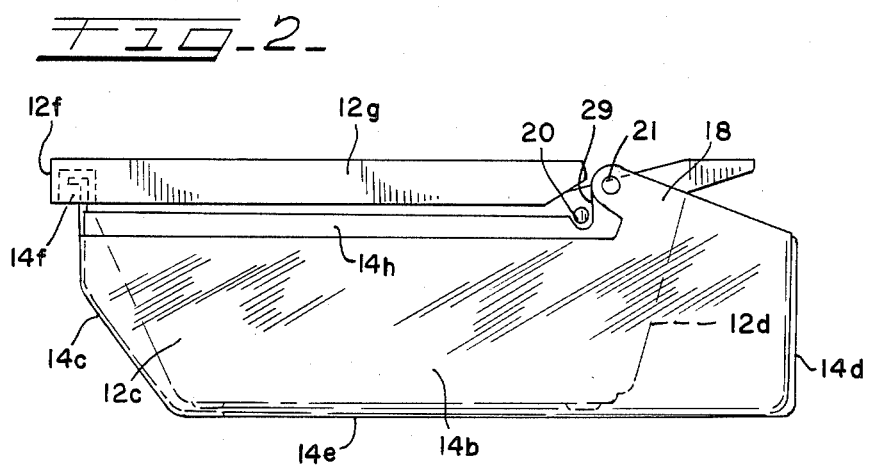
FIG. 2 is a side elevational view of the tray nested inside its cover.

As shown in FIG. 2, the tray 12 fits within the overturned cover 14. The bosses 20 fit within a notch or cut-out 29 formed in the cover sidewalls 14a, 14b in this nested condition. This allows the bosses 20 to be spaced downwardly from the upper edge of the tray 12 without affecting the depth of the cover, while still permitting the tray 12 to rest flat within the overturned cover 14.

The notches 29 also prevent the tray 12 from sliding within the cover 12 when nested. It will be noted in this regard that an extended front portion 14f of the front wall 14c of the cover 14 fits within a cavity 12f formed in the front wall 12c of the tray 12 to further fix the tray against movement.

The unassembled cover 14 and tray 12, when nested, thus provide a compact arrangement having a low-profile that minimizes the volume of the container for packing, shipping and storing.

Another feature of the container 10 resides in the mating of the cover 14 and tray 12 in the closed position (FIG. 1). The cover 14 has a lip formed by bottom edge portions 14g, 14h. The edge portions 14g, 14h are slightly indented relative to their respective cover sidewalls 14a, 14b and the front wall 14c, of which the edge portions 14g, 14h form an integral part. The front wall portion 14f has no such indented edge.

The tray 12 has a corresponding lip formed by top edge portions 12g, 12h that are slightly extended outwardly relative to their respective tray sidewalls 12a, 12b and the front wall 12c, of which the edge portions 12g, 12h form an integral part. The cover edge portions 14g, 14h and tray edge portions 12g, 12h are complimentary so that the tray edge portions 12g, 12h overlap the cover edge portions 14g, 14h when the cover is closed. The cover front portion 14f overlaps a tray edge portion 12f which is not as extended as the tray edge portions 12g, 12h. The closure provided by this arrangement is therefore an interleaved engagement of these edge portions (lips) which yields a sure closure for the receptacle that keeps out dust. More significantly, the tray edge portions 12g, 12h prevent the cover from being removed when closed and locked. That is, the lateral sidewalls 14a, 14b of the cover cannot be moved outwardly when the cover 14 is closed. This substantially prevents the arm portions 18 from being pried over the bosses 20 to gain access to the container from the rear.

While the invention has been described in connection with a certain presently preferred embodiment, those skilled in the art will recognize many modifications to structure, arrangement, portions, elements, materials and components which can be used in the practice of the invention without departing from the principles of this invention.

What is claimed is:

1. A readily assembled covered container for floppy disks comprising:
   a tray container having sides with an opening defined by said sides,
   a cover for said opening, said cover having a top and sides depending from said top,
   said tray being sized to nest within said cover when said cover and tray are unassembled,
   a boss extending from each of two opposite sides of said tray, each boss having a top, an axis and a surface formed thereon that is inclined toward said top and axis,
   said cover having a bore formed therein on each of two opposite sides within which a respective boss is received to attach said cover to said tray, said opposite sides of said cover each having a leading edge,
   a ramp being formed in each of said opposite cover sides extending from a respective leading edge to said bore, said ramp having sidewalls sized to permit a respective boss to slide therebetween and up said ramp,
   said opposite sides of said tray and cover being overlapped in assembly of the container, said cover being attached to said tray by sliding said overlapped sides relative to each other with said bosses sliding along respective ramps to seat said bosses within respective bores with said leading edges of said cover sides first contacting and then riding up said inclined surfaces to thereby flex said overlapped sides apart, with said overlapped sides then being unflexed and moving together upon seating of said bosses in said apertures, and
   a lip formed along a top edge of said tray sides on said opposite tray sides and a front tray side, said cover also having a lip formed along a bottom edge of said cover sides on said opposite sides and a front cover side, said tray and cover lips being complimentarily formed to mate in an overlapping interleaved engagement when said cover is closed on said tray with said cover lip fitting within said tray lip along a portion of said tray sides and said tray lip fitting within said cover lip along another portion of said tray sides.

2. The container of claim 1 wherein said tray is sized to nest within said cover when said cover and tray are unassembled.

3. The container of claim 1 wherein one of said tray and cover is sized to nest within the other of said tray and cover when said cover and tray are unassembled.

* * * * *